US012709656B2

(12) United States Patent
Kobayashi

(10) Patent No.: US 12,709,656 B2
(45) Date of Patent: Aug. 18, 2026

(54) METHOD FOR PRODUCING α-OLEFIN

(71) Applicant: IDEMITSU KOSAN CO.,LTD., Tokyo (JP)

(72) Inventor: Ryoichi Kobayashi, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 483 days.

(21) Appl. No.: 18/560,119

(22) PCT Filed: Jun. 6, 2022

(86) PCT No.: PCT/JP2022/022805
§ 371 (c)(1),
(2) Date: Nov. 10, 2023

(87) PCT Pub. No.: WO2022/264852
PCT Pub. Date: Dec. 22, 2022

(65) Prior Publication Data

US 2024/0360254 A1 Oct. 31, 2024

(30) Foreign Application Priority Data

Jun. 18, 2021 (JP) ................................ 2021-101782

(51) Int. Cl.
*C07C 11/02* (2006.01)
*C08F 2/01* (2006.01)
*C08F 4/659* (2006.01)
*C08F 110/02* (2006.01)

(52) U.S. Cl.
CPC .............. *C08F 110/02* (2013.01); *C08F 2/01* (2013.01); *C08F 4/65912* (2013.01)

(58) Field of Classification Search
CPC .. C07C 2/22; C07C 2/30; C07C 11/02; C07C 11/08; C07C 11/107; C07B 61/00
See application file for complete search history.

(56) References Cited

U.S. PATENT DOCUMENTS 3,300,951 A * 1/1967 Sorg ...................... F22B 37/265 55/423
5,345,022 A 9/1994 Hedrich et al.
7,858,833 B2 * 12/2010 Buchanan ................. C07C 2/32 585/512
8,003,839 B2 * 8/2011 Buchanan ................. C07C 2/32 585/512
8,076,524 B2 * 12/2011 Lattner ..................... C07C 2/36 585/512
2004/0199037 A1 10/2004 Kobayashi et al.
2005/0020866 A1 1/2005 Kobayashi et al.
2007/0185358 A1 * 8/2007 Buchanan ................. C07C 2/32 585/517
2007/0185360 A1 * 8/2007 Buchanan ................. C07C 2/32 585/521
2007/0185362 A1 * 8/2007 Lattner ..................... C07C 2/36 585/521
2010/0312033 A1 * 12/2010 Kalyanaraman .......... C07C 7/10 585/700

FOREIGN PATENT DOCUMENTS

JP 3-220135 A 9/1991
JP 7-508713 A 9/1995
JP 2003-64105 A 3/2003
JP 2003-64107 A 3/2003
JP 2003-95996 A 4/2003

OTHER PUBLICATIONS

International Search Report & Written Opinion issued Aug. 9, 2022 in PCT/JP2022/022805, (with English translation), 11 pages.

* cited by examiner

*Primary Examiner* — Margaret G Moore
(74) *Attorney, Agent, or Firm* — Oblon, McClelland, Maier & Neustadt, L.L.P.

(57) ABSTRACT

A method may produce an α-olefin and may include: (1) continuously introducing an ethylene and a catalyst into a reactor, then mixing and polymerizing to obtain a reaction mixture; (2) continuously separating the reaction mixture into a gas A and a liquid B in a flasher having a separation drop size $d_L$ of formula (1) of $1.0\times10^{-4}$ m or less:

$$d_L = \sqrt{\frac{18\mu v}{g(\rho_L - \rho_V)}}, \quad (1)$$

v being rising speed (m/s) of a gas in the flasher, $\rho_V$ being density ($kg/m^3$) of the gas A, $\rho_L$ being density ($kg/m^3$) of the liquid B, g being gravitational acceleration ($m/s^2$), and μ being viscosity (Pa·s) of the gas A; (3) bringing the gas A into contact with a solvent in a scrubber to obtain a gas C containing an unreacted ethylene and a liquid D containing the solvent; and (4) reusing the gas C in a polymerization.

7 Claims, 3 Drawing Sheets

METHOD FOR PRODUCING α-OLEFIN

CROSS-REFERENCE TO RELATED APPLICATIONS

The present application is the national stage of international application PCT/JP2022/022805, filed on Jun. 6, 2022, and claims the benefit of the filing date of Japanese Appl. No. 2021-101782, filed on Jun. 18, 2021.

TECHNICAL FIELD

The present invention relates to a method for producing an α-olefin.

BACKGROUND ART

α-Olefin is a useful substance widely used as a starting monomer material for olefin polymers, as a comonomer for a variety of high molecular polymers, and also as a starting material for plasticizers, surfactants, and the like.

α-Olefin has been intensively studied for its production methods. In general, for example, ethylene (having 2 carbon atoms) is oligomerized using a Ziegler-based catalyst to obtain a mixture of α-olefins. Then, a mixture of α-olefins having 4 to 20 carbon atoms such as butene (having 4 carbon atoms), hexene (having 6 carbon atoms), and octene (having 8 carbon atoms), or α-olefins having 20 or more carbon atoms, or the like are isolated or separated in the order of the number of carbon atoms such that components with smaller numbers of carbon atoms are first isolated using plural distillation columns to obtain a single component or a mixture required for each of the applications.

The production process generally includes a polymerization-reaction step, a recovery step of unreacted ethylene, a deactivation step of catalyst, a deashing step, and a distillation step of solvent and α-olefin. In the production process, since a polymerization-reaction solution obtained in the polymerization-reaction step contains unreacted ethylene, a method of recovering the ethylene in the recovery step of unreacted ethylene to lower the consumption rate of starting material is normally performed.

PTL 1 discloses, as a production method of ethylene oligomer including a step of recovering unreacted ethylene from polymerization-reaction solution, a method of separating a nonvolatile component such as α-olefin and a gas component containing the unreacted ethylene as the main component from the polymerization-reaction solution using a flasher, and then compressing the unreacted ethylene that is the gas component again to reuse in the polymerization reaction.

CITATION LIST

Patent Literature

PTL 1: JP 2003-064105 A

SUMMARY OF INVENTION

Technical Problem

The gas component obtained by separation from the polymerization-reaction solution using the flasher contains components other than ethylene, such as catalyst, as impurities. In the step of recovering the unreacted ethylene and reusing it in the polymerization reaction, the above-described components that are impurities cause clogging in pipe lines or compressors, heat exchangers, or the like. Therefore, continuous production of α-olefin for a long term has been difficult. Accordingly, a method that can be operated continuously for a long term while inhibiting the clogging by the above-described components has been required.

An object of the present invention is to provide a method for producing an α-olefin, which reduces a clogging of pipe lines and the like in a recovery step of unreacted ethylene and enables a continuous operation for a long term.

Solution to Problem

In view of such circumstances, the present inventor has intensively studied and as a result, has found out that the above-described problem can be solved by a production method including a step of separating a gas contained in a reaction mixture after an ethylene polymerization reaction in a flasher having a specific separation drop size, and bringing the gas into contact with a solvent in a scrubber.

More specifically, the present invention relates to the following [1] to [7].

[1] A method for producing an α-olefin, including:

a step 1 of continuously introducing an ethylene and a catalyst into a reactor, followed by performing a mixing and a polymerization reaction to obtain a reaction mixture;

a step 2 of continuously separating the reaction mixture into a gas A and a liquid B in a flasher having a separation drop size di represented by the formula (1) below of $1.0\times10^{-4}$ m or less;

a step 3 of bringing the gas A into contact with a solvent in a scrubber to obtain a gas C containing an unreacted ethylene and a liquid D containing the solvent; and a step 4 of reusing the gas C in a polymerization reaction:

$$d_L = \sqrt{\frac{18\mu v}{g(\rho_L - \rho_V)}} \quad (1)$$

in which v represents a rising speed (m/s) of a gas in the flasher, $\rho_V$ represents a density ($kg/m^3$) of the gas A, $\rho_L$ represents a density ($kg/m^3$) of the liquid B, g represents the gravitational acceleration ($m/s^2$), and μ represents a viscosity (Pa·s) of the gas A.

[2] The method for producing an α-olefin according to the above [1], in which the scrubber is a plate type scrubber.

[3] The method for producing an α-olefin according to the above [1], in which the scrubber is a bubble tower type scrubber.

[4] The method for producing an α-olefin according to any one of the above [1] to [3], in which in the step 3, a temperature of a liquid in the scrubber is kept at 100° C. or more.

[5] The method for producing an α-olefin according to any one of the above [1] to [4], in which the liquid D obtained in the step 3 is fed to the flasher.

[6] The method for producing an α-olefin according to any one of the above [1] to [5], in which the step 2 is a step of continuously separating the reaction mixture into a gas A and a liquid B in a first flasher having a separation drop size $d_L$ represented by the formula (1)

of $1.0\times10^{-4}$ m or less and then further continuously separating the liquid B into a gas E and a liquid F in a second flasher having a separation drop size $d_T$ represented by the formula (1) of $1.0\times10^{-4}$ m or less, the step 3 is a step including a step of bringing the gas A into contact with a solvent in a first scrubber to obtain a gas C containing an unreacted ethylene and a liquid D containing the solvent and a step of bringing the gas E into contact with a solvent in a second scrubber to obtain a gas G containing an unreacted ethylene and a liquid H containing the solvent, and the step 4 is a step of reusing the gas C and the gas G in a polymerization reaction.

[7] The method for producing an α-olefin according to the above [6], in which the liquid H obtained in the step 3 is fed to the second flasher.

Advantageous Effects of Invention

The method for producing an α-olefin of the present invention can, in the step of recovering the unreacted ethylene after the polymerization reaction to reuse it in the polymerization reaction, reduce a clogging of pipe lines and the like and therefore enables a continuous operation for a long term.

DESCRIPTION OF EMBODIMENTS

Figure 1:
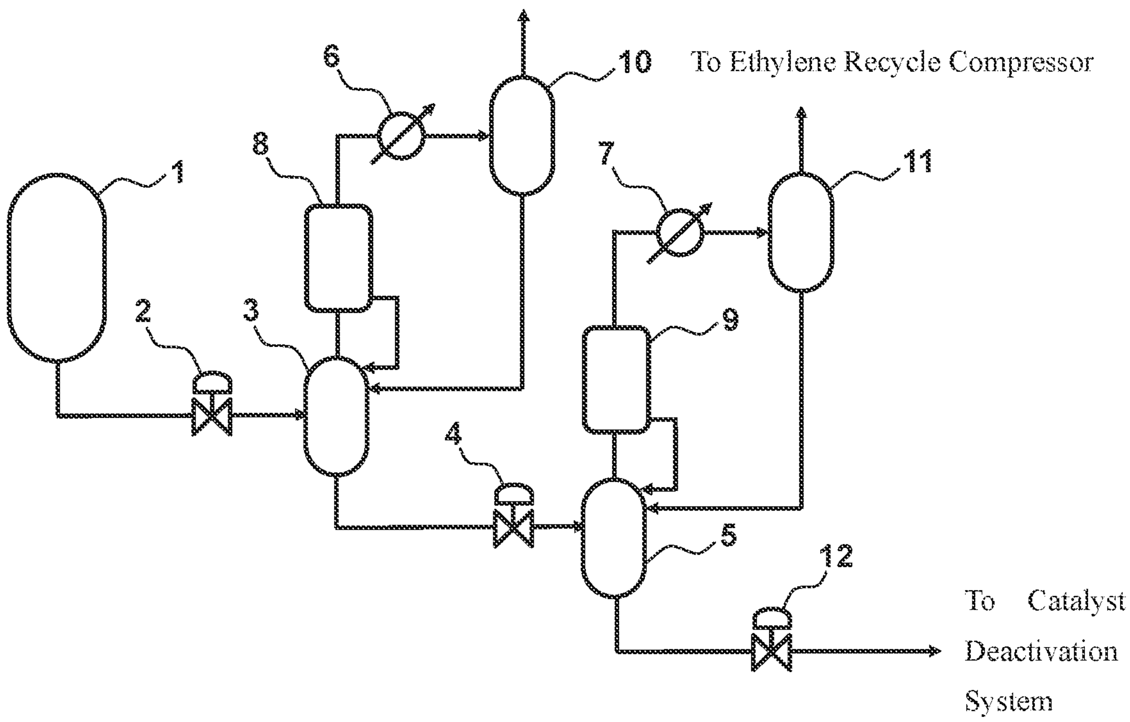
FIG. 1 is a schematic flow chart illustrating an example of the process for performing the present invention.

The present invention is a method for producing an α-olefin, including: a step 1 of continuously introducing an ethylene and a catalyst into a reactor, followed by performing a mixing and a polymerization reaction to obtain a reaction mixture; a step 2 of continuously separating the reaction mixture into a gas A and a liquid B in a flasher having a separation drop size $d_L$ represented by the formula (1) below of $1.0\times10^{-4}$ m or less; a step 3 of bringing the gas A into contact with a solvent in a scrubber to obtain a gas C containing an unreacted ethylene and a liquid D containing the solvent; and a step 4 of reusing the gas C in a polymerization reaction:

$$d_L = \sqrt{\frac{18\mu v}{g(\rho_L - \rho_V)}} \quad (1)$$

in which v represents a rising speed (m/s) of a gas in the flasher, $\rho_V$ represents a density ($kg/m^3$) of the gas A, $\rho_L$ represents a density ($kg/m^3$) of the liquid B, g represents the gravitational acceleration ($m/s^2$), and μ represents a viscosity (Pa·s) of the gas A.

In the production method of the present invention, two of the above-described flashers may be installed and used, and it is preferred to use two flashers. Namely, it is preferred to employ a second flasher in addition to a first flasher. It is more preferred to further employ a first scrubber after the first flasher, and a second scrubber after the second flasher.

In the case of employing the second flasher, it is preferred that in the method for producing an α-olefin of the present invention, the step 2 is a step of continuously separating the reaction mixture into a gas A and a liquid B in a first flasher having a separation drop size di represented by the formula (1) of $1.0\times10^{-4}$ m or less and then further continuously separating the liquid B into a gas E and a liquid F in a second flasher having a separation drop size $d_L$ represented by the formula (1) of $1.0\times10^{-4}$ m or less, the step 3 is a step including a step of bringing the gas A into contact with a solvent in a first scrubber to obtain a gas C containing an unreacted ethylene and a liquid D containing the solvent and a step of bringing the gas E into contact with a solvent in a second scrubber to obtain a gas G containing an unreacted ethylene and a liquid H containing the solvent, and the step 4 is a step of reusing the gas C and the gas G in a polymerization reaction.

By employing the second flasher in addition to the first flasher, in the case of recovering the same amount of ethylene in a gas phase side, a solvent component accompanying the gas phase side can be significantly reduced, which is preferred.

Each of the steps of the present invention is described below.

[Step 1]

The step 1 is a step of continuously introducing an ethylene and a catalyst into a reactor, followed by performing a mixing and a polymerization reaction to obtain a reaction mixture. In the present step, ethylene is subjected to a polymerization reaction and a reaction mixture containing α-olefin is obtained.

<Catalyst>

In the step 1, catalyst is used to polymerize ethylene. As the catalyst, a Ziegler-based catalyst is preferred.

The Ziegler-based catalyst preferably contains a combination of (A) a transition metal compound and (B) an organoaluminum, and, in addition, (C) a third component to be used as desired. As the (A) transition metal compound, a compound represented by the general formula (I) may be used:

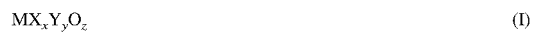

$MX_xY_yO_z$ (I)

in which M represents a zirconium atom or a titanium atom; X represents a chlorine atom, a bromine atom, or an iodine atom; Y represents RO—, $R_2N$—, —OCOR, —$OSO_3R$, R—, —Cp, or a β-diketonato represented by the formula (II), in which —Cp represents a cyclopentadienyl group and R represents a linear or branched alkyl group having 1 to 20 carbon atoms:

(II)

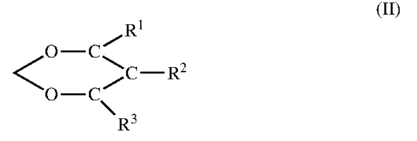

in which $R^1$, $R^2$, and $R^3$ each independently represent a hydrogen atom, an alkyl group having 1 to 20 carbon atoms, or an alkyl group which is substituted with a halogen atom and which has 1 to 20 carbon atoms, with the proviso that at least one of $R^1$, $R^2$, and $R^3$ is an alkyl group which is substituted with a halogen atom and which has 1 to 20 carbon atoms; and x, y, and z each independently represent an integer of 0 to 4, with the proviso that x+y+z=4.

M is preferably a zirconium atom. X is preferably a chlorine atom. x is preferably 4. y is preferably 0. z is preferably 0.

Specific examples of such a compound include $ZrCl_4$, $ZrBr_4$, $ZrI_4$, $ZrBrCl_3$, $ZrBr_2Cl_2$, $TiCl_4$, $TiBr_4$, $TiI_4$, $TiBrCl_3$, $TiBr_2Cl_2$, $Zr(OC_2H_5)_4$, $Zr(OC_2H_5)_2Cl_2$, $Zr(O\text{-n-}C_3H_7)_4$, $Zr(O\text{-n-}C_3H_7)_2Cl_2$, $Zr(O\text{-iso-}C_3H_7)_4$, $Zr(O\text{-iso-}C_3H_7)_2Cl_2$, $Zr(O\text{-n-}C_4H_9)_4$, $Zr(O\text{-n-}C_4H_9)_2Cl_2$, $Zr(O\text{-iso-}C_4H_9)_4$, $Zr(O\text{-iso-}C_4H_9)_2C_{12}$, $Zr(O\text{-tert-}CAH_9)_4$, $Zr(O\text{-tert-}C_4H_9)_2C_{12}$, $Zr((CH_3)_2N)_4$, $Zr((C_2H_5)_2N)_4$, $Zr((n\text{-}C_3H_7)_2N)_4$, $Zr((iso\text{-}C_3H_7)_2N)_4$, $Zr((n\text{-}C_4H_9)_2N)_4$, $Zr((tert\text{-}C_4H_9)_2N)_4$, $Zr(OSO_3CH_3)_4$, $Zr(OSO_3C_2H_5)_4$, $Zr(OSO_3C_3H_7)_4$, $Zr(OSO_3C_4H_9)_4$, $ZrCp_2Cl_2$, $ZrCp_2ClBr$, $Ti(OC_2H_5)_4$, $Ti(OC_2H_5)_2Cl_2$, $Ti(O\text{-n-}C_3H_7)_4$, $Ti(O\text{-n-}C_3H_7)_2Cl_2$, $Ti(O\text{-iso-}C_3H_7)_4$, $Ti(O\text{-iso-}C_3H_7)_2Cl_2$, $Ti(O\text{-n-}C_4H_9)_4$, $Ti(O\text{-n-}C_4H_9)_2Cl_2$, $Ti(O\text{-iso-}C_4H_9)_4$, $Ti(O\text{-iso-}C_4H_9)_2Cl_2$, $Ti(O\text{-tert-}C_4H_9)_4$, $Ti(O\text{-tert-}C_4H_9)_2Cl_2$, $Ti((CH_3)_2N)_4$, $Ti((C_2H_5)_2N)_4$, $Ti((n\text{-}C_3H_7)_2N)_4$, $Ti((iso\text{-}C_3H_7)_2N)_4$, $Ti((n\text{-}C_4H_9)_2N)_4$, $Ti((tert\text{-}C_4H_9)_2N)_4$, $Ti(OSO_3CH_3)_4$, $Ti(OSO_3C_2H_5)_4$, $Ti(OSO_3C_3H_7)_4$, $Ti(OSO_3C_4H_9)_4$, $TiCp_2Cl_2$, $TiCp_2ClBr$, $Zr(OCOC_2H_5)_4$, $Zr(OCOC_2H_5)_2Cl_2$, $Zr(OCOC_3H_7)_4$, $Zr(O)COC_3H_7)_2Cl_2$, $Zr(OCOC_4H_9)_4$, $Zr(OCOC_4H_9)_2Cl_2$, $Ti(OCOC_2H_5)_4$, $Ti(OCOC_2H_5)_2Cl_2$, $Ti(OCOC_3H_7)_4$, $Ti(OCOC_3H_7)_2Cl_2$, $Ti(OCOC_4H_9)_4$, $Ti(OCOC_4H_9)_2Cl_2$, $ZrCl_2$ $(HCOCFCOF)_2$, and $ZrCl_2$ $(CH_3COCFCOCH_3)_2$. Among these, $ZrCl_4$, $Zr(O\text{-n-}C_3H_7)_4$, and $Zr(O\text{-n-}C_4H_9)_4$ are preferred, and $ZrCl_4$ is more preferred.

Examples of the (B) organoaluminum include a compound represented by the general formula (III) and/or the general formula (IV):

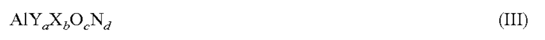

$AlY_aX_bO_cN_d$ (III)

in which X represents a chlorine atom, a bromine atom, or an iodine atom; Y represents RO—, $R_2N$—, —OCOR, or R—, where R represents a linear or branched alkyl group having 1 to 20 carbon atoms; and a, b, c, and d each independently represent an integer of 0 to 3, with the proviso that a+b+c+d=3;

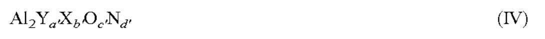

$Al_2Y_{a'}X_{b'}O_{c'}N_{d'}$ (IV)

in which X represents a chlorine atom, a bromine atom, or an iodine atom; Y represents RO—, $R_2N$—, —OCOR, —RCOCR'COR", or R—, where R, R' and R" each independently represent a linear or branched alkyl group having 1 to 20 carbon atoms; and a', b', c', and d' each independently represent an integer of 0 to 6, with the proviso that a'+b'+c'+d'=6.

Examples of the compound represented by the general formula (III) include $Al(CH_3)_3$, $Al(C_2H_5)_3$, $Al(C_3H_7)_3$, $Al(iso\text{-}C_3H_7)_3$, $Al(C_4H_9)_3$, $Al(iso\text{-}C_4H_9)_3$, $Al(CsH_{11})_3$, $Al(C_6H_{13})_3$, $Al(C_8H_{17})_3$, $Al(C_2H_5)_2Cl$, $Al(C_2H_5)_2Br$, $Al(C_2H_5)_2I$, $Al(C_2H_5)Cl_2$, $Al(C_2H_5)Br_2$, $Al(C_2H_5)I_2$, $AlC_2H_5(OC_2H_5)_2$, $AlC_2H_5(OC_3H_7)_2$, $AlC_2H_5(OC_4H_9)_2$, $Al(OC_2H_5)_2Cl$, $Al(OC_3H_7)_2Cl$, $Al(OC_4H_9)_2Cl$, $Al(OC_2H_5)C_{12}$, $Al(OC_3H_7)Cl_2$, $Al(OC_4H_9)C_{12}$, $AlC_2H_5(OCOC_2H_5)_2$, $AlC_2H_5(OCOC_3H_7)_2$, $AlC_2H_5(OCOC_4H_9)_2$, $Al(OCOC_2H_5)_2Cl$, $Al(OCOC_3H_7)_2Cl$, $Al(OCOC_4H_9)_2Cl$, $Al(OCOC_2H_5)C_{12}$, $Al(OCOC_3H_7)Cl_2$, $Al(OCOC_4H_9)C_{12}$, $Al(C_2H_5)_2OC_2H_5$, $Al(C_2H_5)_2OC_3H_7$, $Al(C_2H_5)_2OCH_9$, $Al(C_2H_5)_2(N(C_2H_5)_2)$, $Al(C_2H_5)_2(N(C_3H_7)_2)$, and $Al(C_2H_5)_2N(C_4H_9)_2$. Among these, $Al(C_2H_5)_3$, $Al(iso\text{-}CAH_9)_3$, and $Al(C_8H_{17})_3$ are preferred, and $Al(C_2H_5)_3$ is more preferred.

Examples of the compound represented by the general formula (IV) include $Al_2(CH_3)_3Cl_3$, $Al_2(CH_3)_3Br_3$, $Al_2(C_2H_5)_3Cl_3$, $Al_2(C_2H_5)_3Br_3$, $Al_2(C_2H_5)_3I_3$, $Al_2(C_2H_5)_3BrCl_2$, $Al_2(C_3H_7)_3Cl_3$, $Al_2(iso\text{-}C_3H_7)_3Cl_3$, $Al_2(C_4H_9)_3Cl_3$, $Al_2(iso\text{-}C_4H_9)_3Cl_3$, $Al_2(CsH_{11})_3Cl_3$, $Al_2(C_8H_{17})_3Cl_3$, $Al_2(C_2H_5)_2(CH_3)Cl_3$, $Al_2(OC_2H_5)_3Cl_3$, $Al_2(OC_3H_7)_3Cl_3$, $Al_2(OCH_9)_3Cl_3$, $Al_2(OCOC_2H_5)_3Cl_3$, $Al_2(OCOC_3H_7)_3Cl_3$, and $Al_2(OCOC_4H_9)_3Cl_3$. Among these, $Al_2(CH_3)_3Cl_3$, $Al_2(C_2H_5)_3Cl_3$, and $Al_2(iso\text{-}C_4H_9)_3Cl_3$ are preferred, and $Al_2(C_2H_5)_3Cl_3$ is more preferred.

As the third component (C), which is used as desired, at least one compound selected from the group consisting of a sulfur compound, a phosphorus compound, and a nitrogen compound may be used. The third component contributes to improvement of the purity of the α-olefin to be obtained.

The sulfur compound is not limited as long as it is an organosulfur compound, and preferred examples of the sulfur compound include thioethers such as dimethyl sulfide, diethyl sulfide, dipropyl sulfide, dihexyl sulfide, dicyclohexyl sulfide, and diphenyl thioether; dialkyl disulfide compounds such as dimethyl disulfide, diethyl disulfide, dipropyl disulfide, dibutyl disulfide, dihexyl disulfide, dicyclohexyl disulfide, and ethylmethyl disulfide; thiophenes such as thiophene, 2-methylthiophene, 3-methylthiophene, 2,3-dimethylthiophene, 2-ethylthiophene, and benzothiophene, and heterocyclic sulfur compounds such as tetrahydrothiophene and thiopyrane; aromatic sulfur compounds such as diphenyl sulfide, diphenyl disulfide, methylphenyl disulfide, and methylphenyl sulfide; thiourea; and sulfides such as methyl sulfide, ethyl sulfide, and butyl sulfide.

The phosphorus compound is not limited as long as it is an organophosphorus compound, and preferred examples of the phosphorus compound include phosphines such as triphenylphosphine, triethylphosphine, tributylphosphine, tripropylphosphine, trioctylphosphine, and tricyclohexylphosphine.

The nitrogen compound is not limited as long as it is an organonitrogen compound, and preferred examples of the nitrogen compound include organic amines such as methylamine, ethylamine, propylamine, butylamine, pentylamine, hexylamine, cyclohexylamine, octylamine, decylamine, aniline, benzylamine, naphthylamine, dimethylamine, diethylamine, dibutylamine, diphenylamine, methylphenylamine, trimethylamine, triethylamine, tributylamine, triphenylamine, pyridine, and picoline.

Among the sulfur compounds, phosphorus compounds, and nitrogen compounds, for example, one or more compounds selected from the group consisting of dimethyl disulfide, thiophene, thiourea, triphenylphosphine, tributylphosphine, trioctylphosphine, and aniline may be preferably used.

<Conditions, etc. of Polymerization Reaction>

The polymerization reaction of ethylene is preferably performed in an organic solvent. The amount of the organic solvent used in the polymerization reaction of ethylene is preferably 0.5 times by mass to 5 times by mass of α-olefin to be produced. Examples of the organic solvent include alicyclic compounds such as cyclohexane and decalin; aromatic hydrocarbons such as benzene, toluene, xylene, chlorobenzene, ethylbenzene, dichlorobenzene, and chlorotoluene, and halides thereof; aliphatic hydrocarbons such as pentane, hexane, heptane, octane, nonane, and decane; and halogenated aliphatic hydrocarbons such as dichlorocthane and dichlorobutane. Among these, alicyclic compounds are preferred, and cyclohexane is more preferred.

In the present step, the blending ratio between the organic solvent and the (A) transition metal compound, the (B) organoaluminum, and the (C) third component in the catalyst is as follows. In terms of the amount in 250 mL of the organic solvent, the amount of the (A) transition metal compound is preferably 0.01 to 5 mmol and more preferably 0.03 to 1 mmol. The amount of the (B) organoaluminum is preferably 0.05 to 15 mmol and more preferably 0.06 to 3 mmol. The amount of the (C) third component is preferably 0.05 to 20 mmol; in the case where the sulfur compound is used as the (C) third component, the amount is preferably 0.1 to 10 mmol; in the case where the nitrogen compound or the phosphorus compound is used as the (C) third component, the amount is preferably 0.05 to 5 mmol. With respect to the blending ratio between the (A) transition metal compound and the (B) organoaluminum, Al/Zr or Ti(molar ratio) is preferably set to fall within the range of 1 to 15. The blending ratio [Al/Zr or Ti(molar ratio)] between the (A) transition metal compound and the (B) organoaluminum is more preferably 2 to 10 and further preferably 4 to 9.

The polymerization reaction in the present step is performed preferably at a temperature of 100 to 150° C. under a pressure of 30 to 90 $kg/cm^2 \cdot G$ (2.94 to 8.82 MPa). Ethylene gas pressure is preferably 30 to 90 $kg/cm^2 \cdot G$ (2.94 to 8.82 MPa) and more preferably 50 to 80 $kg/cm^2 \cdot G$ (4.90 to 7.84 MPa). While the reaction time varies depending on the temperature and pressure and cannot be specified in a uniform manner, it is preferably 10 minutes or more, and preferably 60 minutes or less and more preferably 50 minutes or less. In the case of using a continuous reaction device, a residence time in the reaction device is preferably 10 minutes or more and more preferably 30 minutes or more, and preferably 60 minutes or less and more preferably 50 minutes or less. The reactor is preferably a complete mixing tank-type reactor.

[Step 2]

In the production method of the present invention, the step 2 is a step of continuously separating the reaction mixture obtained in the step 1 into a gas A and a liquid B in a flasher having a separation drop size $d_L$ represented by the following formula (1) of $1.0 \times 10^{-4}$ m or less:

$$d_L = \sqrt{\frac{18\mu v}{g(\rho_L - \rho_V)}} \tag{1}$$

in which v represents a rising speed (m/s) of a gas in the flasher, $\rho_V$ represents a density ($kg/m^3$) of the gas A, $\rho_L$ represents a density ($kg/m^3$) of the liquid B, g represents the gravitational acceleration ($m/s^2$), and μ represents a viscosity (Pa·s) of the gas A.

The present step is described with reference to FIG. 1. FIG. 1 is an example of a conceptual view of a device used for the production method of the present invention.

The polymerization reaction of ethylene according to the step 1 is performed in a reactor 1. The reaction mixture obtained here contains catalyst, solvent, by-produced polymers, unreacted ethylene, and the like, in addition to the α-olefin as the objective product. The reaction mixture is supplied to a flasher 3 via a control valve 2. Separation into gas A and liquid B is carried out by performing a pressure reduction in the flasher 3. The gas A mainly contains unreacted ethylene and the liquid B mainly contains α-olefin, catalyst, and solvent. The gas A is discharged from an upper part of the flasher 3, and the liquid B is discharged from a lower part of the flasher 3.

The present embodiment illustrated in FIG. 1 further employs a second flasher 5, but the flasher 5 is an optional but not an essential constitution. By using the flasher 5 that is a second flasher, unreacted ethylene can be more effectively recovered. The liquid B discharged from the lower part of the first flasher 3 is supplied to the flasher 5 via a control valve 4. Separation is carried out into gas (gas E) mainly containing unreacted ethylene and liquid (liquid F) mainly containing α-olefin, catalyst, and solvent in the flasher 5, in the same manner as in the flasher 3. The gas E separated is discharged from an upper part of the flasher 5, and the liquid F separated is discharged from a lower part of the flasher 5. The liquid F discharged from the lower part of the flasher 5 is sent to a catalyst deactivation step.

Namely, in the case of employing the second flasher, the step 2 is a step of continuously separating the reaction mixture into a gas A and a liquid B in a flasher having a separation drop size $d_L$ represented by the formula (1) of $1.0 \times 10^{-4}$ m or less and then further continuously separating the liquid B into a gas E and a liquid F in a flasher having a separation drop size $d_L$ represented by the formula (1) of $1.0 \times 10^{-4}$ m or less. More specifically, in the case of employing the second flasher, the step 2 is a step of continuously separating the reaction mixture into a gas A and a liquid B in a first flasher having a separation drop size $d_L$ represented by the formula (1) of $1.0 \times 10^{-4}$ m or less and then further continuously separating the liquid B into a gas E and a liquid F in a second flasher having a separation drop size $d_L$ represented by the formula (1) of $1.0 \times 10^{-4}$ m or less.

The control valve 2 may be directly attached to the flasher 3. The control valve 4 may be directly attached to the flasher 5. By directly attaching the valve to the flasher, the occurrence of clogging in pipe lines from the valve to the flasher can be inhibited. Therefore, it is preferred to directly attach each of the valves to the flasher.

In the case of employing the second flasher, the gas A shall be replaced with the gas E and the liquid B shall be replaced with the liquid F regarding the second flasher, in the description of the first flasher in the present description.

In the case of an embodiment not employing the second flasher 5, the liquid B discharged from the lower part of the flasher 3 is sent to a catalyst deactivation step.

The flasher used in the present step has a separation drop size $d_L$ represented by the formula (1) of $1.0 \times 10^{-4}$ m or less. At least one of the flashers 3 and 5 has a separation drop size $d_L$ represented by the formula (1) of $1.0 \times 10^{-4}$ m or less, and it is preferred that the both thereof have a separation drop size $d_L$ represented by the formula (1) of $1.0 \times 10^{-4}$ m or less.

By having a separation drop size $d_L$ represented by the formula (1) of $1.0 \times 10^{-4}$ m or less, the amount of components other than ethylene, such as the catalyst, which accompany the gas discharged from the flasher can be reduced. By reducing the amount of components other than ethylene, which accompany the gas, clogging of pipe lines and the like can be reduced, and a load on a scrubber in a step 3 can be reduced to improve production efficiency. Especially, dirt and clogging in pipe lines from the flasher to the scrubber can be reduced.

The separation drop size $d_L$ is $1.0 \times 10^{-4}$ m or less, preferably $7.0 \times 10^{-5}$ m or less, and more preferably $5.0 \times 10^{-5}$ m or less. The lower limit value is not limited, but the separation drop size $d_L$ is preferably $1.0 \times 10^{-5}$ m or more from a viewpoint of setting the inside diameter of the flasher so that it is not too large. By setting the inside diameter of the flasher so that it is not too large, a device cost of the flasher is reduced and an installation area is reduced, which are preferred.

The separation drop size $d_L$ can be adjusted to fall within the above ranges by, for example, adjusting a rising speed (v) of gas in the flasher. Specifically, for example, the rising speed can be adjusted by the inside diameter of the flasher and a pressure in the flasher. Namely, by increasing the inside diameter of the flasher, the rising speed of gas in the flasher can be decreased, and the separation drop size $d_L$ can be decreased as a result. In addition, by decreasing the difference between a pressure in the flasher and a pressure in the polymerization-reaction step, an amount of gas generated by a separation and the rising speed of gas in the flasher can be decreased, and the separation drop size $d_L$ can be decreased as a result.

In the flasher, there may be provided, in addition to an inlet port for introducing the reaction mixture, an inlet port for introducing solvent, and the solvent may be sprayed to a gas phase in the flasher during the separation of the gas (A or E) and the liquid (B or F). By spraying the solvent to the gas phase in the flasher, the amounts of the catalyst and by-produced polymers which accompany the gas A or the gas E can be reduced. A drop size of the solvent sprayed to the gas phase in the flasher is preferably equal to or larger than the separation drop size di, of the flasher, and is more preferably $1.0\times10^{-4}$ m or more.

A temperature during the continuous separation of the gas A and the liquid B in the flasher is preferably 100° C. or more. The upper limit of the temperature during the separation of the gas A and the liquid B is not limited, but the temperature is preferably 150° C. or less.

Regarding a pressure during the continuous separation of the gas A and the liquid B in the flasher, a rate of a pressure in the first flasher to a pressure in the reactor [first flasher/reactor] is preferably 1/3 to 1/2.

In the case of using the second flasher, a temperature during the continuous separation of the gas E and the liquid F in the flasher is preferably 100° C. or more. The upper limit of the temperature during the separation of the gas E and the liquid F is not limited, but the temperature is preferably 150° C. or less.

Regarding a pressure during the continuous separation of the gas E and the liquid F in the flasher, a rate of a pressure in the second flasher to a pressure in the first flasher [second flasher/first flasher] is preferably 1/15 to 1/2, more preferably 1/12 to 1/4, and further preferably 1/10 to 1/6.

After the second flasher 5, one or more flashers may be further employed. Specifically, a third flasher may be employed, and a fourth flasher may be employed after the third flasher. In the third flasher and the fourth flasher also, separation of gas and liquid is performed in the same manner as in the first flasher and the second flasher. In the third and succeeding flashers also, a rate of a pressure in the flasher to a pressure in the previous flasher has the same preferable range as the above-described rate of a pressure in the second flasher to a pressure in the first flasher.

[Step 3]

In the production method of the present invention, the step 3 is a step of bringing the gas A obtained in the step 2 into contact with a solvent in a scrubber to obtain a gas C containing an unreacted ethylene and a liquid D containing the solvent. By the present step, components other than ethylene, such as catalyst, contained in the gas A can be separated in the solvent and removed.

The main component of the gas A obtained in the step 2 is unreacted ethylene, and small amounts of components other than the unreacted ethylene, such as catalyst, solvent, the α-olefin as the product, and by-produced polymers, accompany the gas flow of the unreacted ethylene. The catalyst and the by-produced polymers accompanying the unreacted ethylene adhere to pipe lines, a heat exchanger 6 (and a heat exchanger 7), an ethylene recycle compressor, and the like to cause clogging, and therefore disturb continuous production for a long term.

Accordingly, it is preferred to perform the present step immediately after the gas A is separated in the flasher and before the gas A is fed to a device such as a heat exchanger. Especially, since possibility of generation of precipitate in a heat exchanger by cooling of the gas A is high, it is preferred to install a scrubber before the heat exchanger.

In a scrubber 8, the gas discharged from the upper part of the flasher 3 is brought into contact with solvent.

The solvent used here is preferably the same one as the organic solvent used in the polymerization reaction in the step 1. Specifically, examples of the solvent include alicyclic compounds such as cyclohexane and decalin; aromatic hydrocarbons such as benzene, toluene, xylene, chlorobenzene, ethylbenzene, dichlorobenzene, and chlorotoluene, and halides thereof; aliphatic hydrocarbons such as pentane, hexane, heptane, octane, nonane, and decane; and halogenated aliphatic hydrocarbons such as dichloroethane and dichlorobutane. Among these, the solvent used in the step 3 is preferably the same as the organic solvent used in the polymerization reaction in the step 1. By using the same solvent as in the polymerization reaction, separation of α-olefin and the solvent obtained by continuous reaction can be made easier.

Condensed liquid from the heat exchanger 6 and the heat exchanger 7 disposed downstream of the scrubber may be used in place of a part or the all of the solvent used in the scrubber. In this case, it is preferred to mix the solvent introduced to the scrubber and the condensed liquid and use the mixture in the scrubber, which has an advantage of reducing the used amount of the solvent.

The gas C containing unreacted ethylene is discharged from an upper part of the scrubber 8. The liquid D containing the solvent is discharged from a lower part of the scrubber 8.

The embodiment illustrated in FIG. 1 further employs the second flasher 5. Therefore, in a scrubber 9, the gas E discharged from the upper part of the flasher 5 is brought into contact with solvent. The scrubber 9 can have the same constitution as the scrubber 8. Gas G containing unreacted ethylene is discharged from an upper part of the scrubber 9. Liquid H containing the solvent is discharged from a lower part of the scrubber 9.

Since the second flasher 5 is an optional but not an essential constitution, the scrubber 9 is not an essential constitution, either.

Namely, in the case of employing the second flasher, the step 3 is a step including a step of bringing the gas A into contact with a solvent in a scrubber to obtain a gas C containing an unreacted ethylene and a liquid D containing the solvent and a step of bringing the gas E into contact with a solvent in a scrubber to obtain a gas G containing an unreacted ethylene and a liquid H containing the solvent. More specifically, in the case of employing the second flasher, a second scrubber is employed, and the step 3 is a step including a step of bringing the gas A into contact with a solvent in the first scrubber to obtain a gas C containing an unreacted ethylene and a liquid D containing the solvent and a step of bringing the gas E into contact with a solvent in the second scrubber to obtain a gas G containing an unreacted ethylene and a liquid H containing the solvent.

In the case of employing the second flasher, the gas C shall be replaced with the gas G and the liquid D shall be replaced with the liquid H regarding the second flasher, in the description of the first flasher in the present description.

The liquid D discharged from the lower part of the scrubber 8 is preferably fed to the flasher. By feeding the liquid D to the flasher, remaining unreacted ethylene can be further recovered. The same applies to the liquid H discharged from the scrubber 9. Namely, in the case of employing the second flasher, the liquid H obtained in the step 3 is preferably fed to the second flasher.

In the case of further employing the third flasher after the second flasher 5, a scrubber may be employed after the third flasher in the same manner as in the first flasher and the second flasher. In the case of further employing the fourth flasher, a scrubber may be employed after the fourth flasher in the same manner as in the first flasher and the second flasher.

The type of the scrubber is not particularly limited as long as it does not impair the object of the present step of bringing the gas A (or the gas E) into contact with solvent to separate components other than ethylene, such as the catalyst, by-produced polymers, and the like contained in the gas A (or the gas E), but a type that can efficiently bring the gas into contact with solvent is preferred. Specifically, the scrubber may be one selected from the group consisting of a bubble tower type scrubber and a plate type scrubber.

Figure 2:
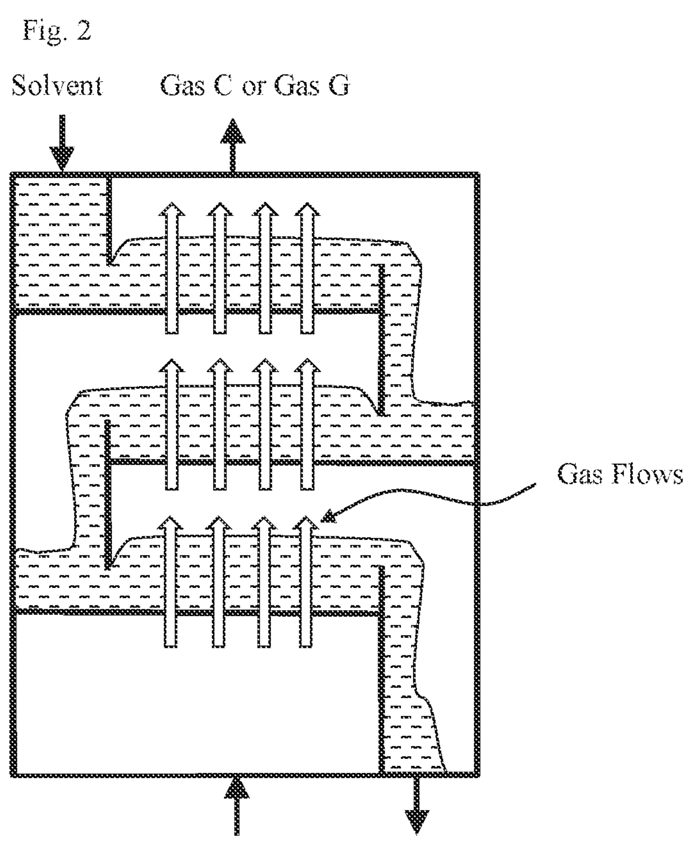
FIG. 2 is a schematic view illustrating an example (plate type) of the scrubber used in the step 3 of the the present invention.

The scrubber used in the present step is preferably a plate type scrubber from a viewpoint of the effect. FIG. 2 illustrates an example of a plate type scrubber. The plate type scrubber introduces the gas A (or the gas E) from a lower part and introduces the solvent from an upper part, so that the gas can be brought into contact with the solvent in plural plates to remove the catalyst and by-produced polymers effectively. White arrows in FIG. 2 schematically indicate gas flows. After the gas is brought into contact with the solvent in plural plates, gas (the gas C or the gas G) from which the catalyst and by-produced polymers have been removed is obtained from the upper part of the scrubber. The plate type scrubber preferably includes 3 or more and 15 or less plates for example, and more preferably includes 5 or more and 10 or less plates from viewpoints of removal effect and efficiency.

Figure 3:
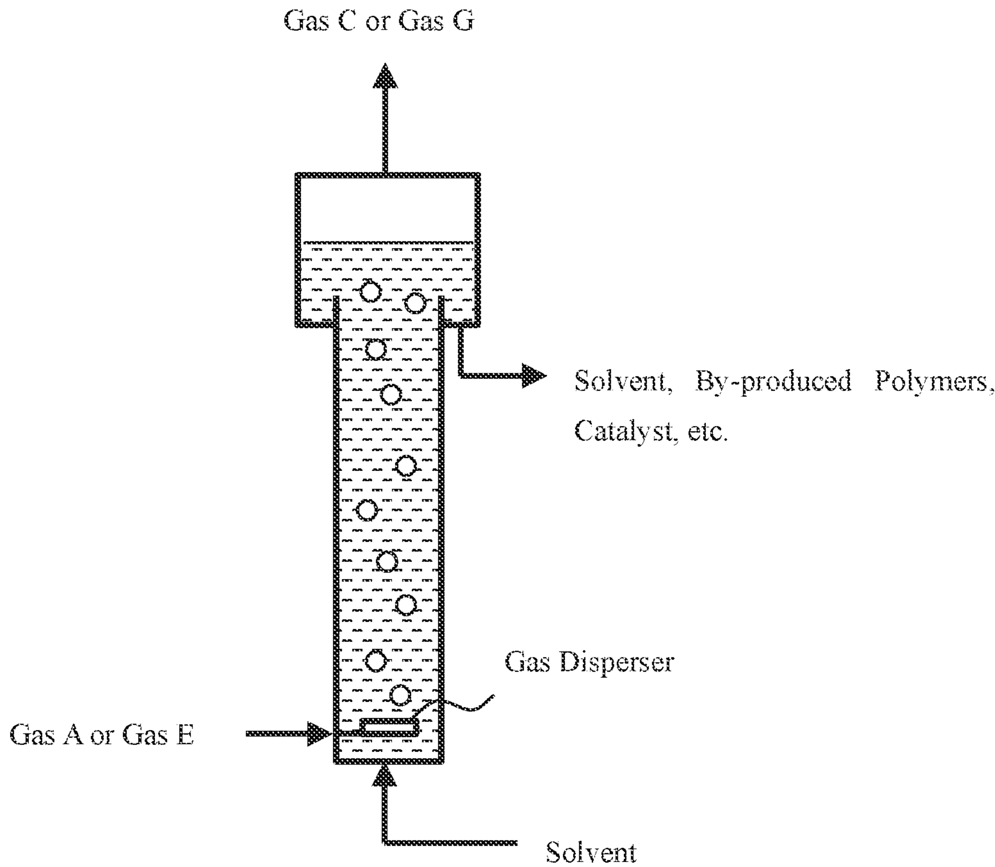
FIG. 3 is a schematic view illustrating an example (bubble tower type) of the scrubber used in the step 3 of the the present invention.

The scrubber used in the present step is preferably a bubble tower type scrubber from a viewpoint of the ease of installation. FIG. 3 illustrates an example of a bubble tower type scrubber. The bubble tower type scrubber injects the gas A (or the gas E) in the form of babbles into the solvent in the tower through a gas disperser at a bottom of the tower, and disperses or dissolves the catalyst, by-produced polymers, and the like contained in the gas A (or the gas E) into the solvent to obtain gas (the gas C or the gas G) from which those components have been removed from a tower top. In this way, the bubble tower type scrubber can, by introducing gas from a lower part of the tower filled with solvent, remove the catalyst while having a simple structure.

The bubble tower type scrubber may be filled with a filler such as Raschig rings. The filler is preferable since it can prevent a short pass of bubbles and improve the effect of removing the catalyst and the like.

The gas discharged from the first flasher tends to contain a larger amount of components other than ethylene, such as catalyst (impurities) than the gas discharged from the second flasher. Therefore, the scrubber (scrubber 8 in the present embodiment, which is installed immediately after the first flasher 3) installed immediately after the first flasher is preferably a plate type scrubber that is excellent in the effect. On the other hand, the scrubber (scrubber 9 in the present embodiment, which is installed immediately after the second flasher 5) installed immediately after the second flasher, at which an amount of components other than ethylene, such as catalyst is relatively small, is preferably a bubble tower type scrubber that is easy to install and excellent in cost.

A temperature of liquid in the scrubber in the present step is preferably kept at 100° C. or more. The temperature of liquid in the scrubber is more preferably kept at 105° C. or more and further preferably kept at 120° C. or more. The temperature is preferably 150° C. or less. By keeping the temperature of liquid in the scrubber to fall within the above ranges, by-produced polymers can be made in a dissolved state and the separation of gas and the catalyst can be made more efficient. The liquid in the scrubber mainly contains the solvent, and contains impurities such as the catalyst and by-produced polymers after being brought into contact with the gas.

[Step 4]

In the production method of the present invention, the step 4 is a step of reusing the gas C obtained in the step 3 in a polymerization reaction.

In FIG. 1, the gas C discharged from the upper part of the scrubber 8 is separated into unreacted ethylene, and solvent and the like by the heat exchanger 6 and a gas-liquid separation tank 10. The unreacted ethylene is discharged from an upper part of the gas-liquid separation tank 10 and the solvent and the like are discharged from a lower part of the gas-liquid separation tank 10. The solvent and the like discharged from the lower part are preferably returned to the flasher 3 again.

The unreacted ethylene discharged from the upper part of the gas-liquid separation tank 10 is introduced to a compressor for ethylene recycle and supplied to the reactor 1. The unreacted ethylene supplied to the reactor 1 as stated above is used as a starting material in the step 1. In this way, ethylene as a starting material can be used without being wasted and discharged to the outside of the system.

Similarly, the gas G discharged from the upper part of the scrubber 9 is separated into unreacted ethylene, and solvent and the like by the heat exchanger 7 and a gas-liquid separation tank 11. The unreacted ethylene is discharged from an upper part of the gas-liquid separation tank 11 and the solvent and the like are discharged from a lower part of the gas-liquid separation tank 11. The solvent and the like discharged from the lower part are preferably returned to the flasher 5 again.

Namely, in the case of employing the second flasher, the step 4 is a step of reusing the gas C and the gas G obtained in the step 3 in a polymerization reaction.

The unreacted ethylene discharged from the upper part of the gas-liquid separation tank 11 is introduced to a compressor for ethylene recycle and supplied to the reactor 1.

The same applies to the case where the third flasher is further employed after the second flasher 5, and the same applies to the case where the fourth flasher is further employed.

[α-Olefin Recovery Step (Step 5)]

The present step is a step (step 5) of recovering α-olefin contained in the liquid (liquid B or liquid F) obtained in the step 2.

The present step includes a catalyst deactivation step, a deashing step, and a distillation step.

In FIG. 1 that is an embodiment that uses two flashers, the liquid F is sent to the catalyst deactivation step via a control valve 12. In an embodiment that uses one flasher, the flasher 5 is not installed in FIG. 1 and therefore the liquid B is sent to the catalyst deactivation step via the control valve 4.

In the catalyst deactivation step, the catalyst is subjected to a deactivation treatment using a deactivating agent. Examples of the deactivating agent include basic nitrogen compounds, water, alcohols, carboxylic acids, and phenols. Examples of the basic nitrogen compounds include ammonia; and amines such as methylamine, ethylamine, propylamine, butylamine, pentylamine, hexylamine, cyclohexylamine, octylamine, decylamine, aniline, benzylamine, naphthylamine, dimethylamine, diethylamine, dibutylamine, diphenylamine, methylphenylamine, trimethylamine, triethylamine, tributylamine, triphenylamine, pyridine, and picoline.

Liquid obtained after the catalyst deactivation step is sent to the deashing step.

In the deashing step, washing with water using a deasher is performed. Thereafter, separation into an oil phase and a water phase in a separation tank is performed. The water phase is discarded as waste water. The oil phase is heated as necessary, and sent to the distillation step.

In the distillation step, the solvent is removed and the α-olefin as the objective product is recovered. By performing fractionation as necessary, α-olefin having an appropriate number of carbons (degree of polymerization) for the application can be obtained.

EXAMPLES

The present invention is described below in more detail by way of Examples, but the present invention is not limited by the Examples.

Example 1

[Preparation of Catalyst]

Catalyst was prepared according to the following procedure. Dry cyclohexane was introduced to a stirring tank having an internal volume of 6.5 $m^3$ under nitrogen atmosphere. Next, triethylaluminum [$(C_2H_5)_3Al$] was introduced. Zirconium tetrachloride anhydride [$ZrCl_4$] was further introduced. Then, ethylaluminum sesquichloride [$(C_2H_5)_3Al_2Cl_3$] was introduced.

Amounts of the above-described starting materials and solvent introduced were based on the amount of zirconium tetrachloride anhydride as follows. Triethylaluminum and ethylaluminum sesquichloride were introduced such that $(C_2H_5)_3Al_2Cl_3/(C_2H_5)_3Al=3.5$ (molar ratio) and $[(C_2H_5)_3Al_2Cl_3+(C_2H_5)_3Al]/ZrCl_4=7$ (molar ratio) were satisfied. Cyclohexane was introduced such that the concentration of zirconium tetrachloride anhydride was 80 mmol relative to 1 L of cyclohexane.

After the addition of all components, the resulting mixture was heated at 70° C. with stirring for 2 hours under nitrogen atmosphere to allow complex formation, thereby preparing a catalyst liquid.

[Step 1: Polymerization Reaction]

The reaction was continuously performed using a complete mixing tank-type reactor (internal volume: about 20 $m^3$). Reaction solvent (cyclohexane) was fed at a rate of 30 tons/hour and the catalyst liquid was fed at a rate of 25 kg/hour. An average residence time was set to about 45 minutes based on the solvent. The reaction was performed at 130° C. at 70 $kg/cm^2 \cdot G$ (6.9 MPa) with stirring at 70 rpm. High-purity ethylene gas was continuously supplied such that a reaction pressure of 70 $kg/cm^2 \cdot G$ was maintained, and polymerization reaction was performed to obtain reaction mixture.

[Step 2: Gas-Liquid Separation]

The reaction mixture obtained in the step 1 was introduced into a flasher (FIG. 1: flasher 3) having a separation drop size di of $3.0\times10^{-5}$ m, and gas-liquid separation was performed to obtain gas component and liquid component.

The liquid component obtained in the flasher 3 in the present step was introduced into a second flasher (FIG. 1: flasher 5) having a separation drop size $d_L$ of $5.0\times10^{-5}$ m, and gas-liquid separation was performed to obtain gas component and liquid component. In the flasher 3, treatment was performed at a temperature of 115° C. and at a pressure of 33.0 $kg/cm^2 \cdot G$, and in the flasher 5, treatment was performed at a temperature of 110° C. and at a pressure of 3.5 $kg/cm^2 \cdot G$.

In each of the flasher 3 and the flasher 5, v, $\rho_V$, $\mu_L$, g, and μ were as below.

Flasher 3 v: 0.023 (m/s)
$\rho_V$: 41.2 ($kg/m^3$)
$\rho_L$: 655 ($kg/m^3$)
g: 9.81 ($m/s^2$)
μ: $1.30\times10^{-5}$ (Pa·s)

Flasher 5 v: 0.090 (m/s)
$\rho_V$: 5.76 ($kg/m^3$)
$\rho_L$: 714 ($kg/m^3$)
g: 9.81 ($m/s^2$)
μ: $1.07\times10^{-5}$ (Pa·s)

[Step 3: Separation and Removal of Catalyst etc.]

The gas components obtained in the step 2 were each made to pass the scrubber 8 and the scrubber 9 and impurities such as the catalyst in the gas components were removed. In both scrubbers, cyclohexane was used as the solvent. The scrubber 8 was a plate type scrubber having 9 plates, and the scrubber 9 was a bubble tower type scrubber. In the scrubber 8, treatment was performed at a liquid temperature of 120° C., and in the scrubber 9, treatment was performed at a liquid temperature of 120° C.

[Step 4: Gas-Liquid Separation and Ethylene Reuse Step]

The gas components from which the catalyst had been removed in the step 3 were cooled in the heat exchanger 6 and the heat exchanger 7, introduced to the gas-liquid separation tank 10 and the gas-liquid separation tank 11, respectively, and separated into unreacted ethylene and liquid component. The unreacted ethylene was introduced to an ethylene recycle compressor, and introduced to the reactor 1 again.

[Step 5: α-Olefin Recovery Step]

The liquid component obtained from the second flasher (FIG. 1: flasher 5) was continuously supplied to a deactivation tank to perform deactivation of the catalyst. As a deactivating agent, an aqueous ammonia having a concentration of 10% by mass was used. The liquid product after the deactivation was subjected to an oil-water separation, and introduced into a distillation unit. By adjusting distillation conditions appropriately in the distillation unit, α-olefins each having 4 to 24 carbon atoms were recovered.

After performing the above-described continuous operation for 180 days, inside the heat exchanger 6 and the heat exchanger 7 was examined and no deposit was seen.

As described above, it can be understood that according to the method of the present invention including a polymerization-reaction step, a gas-liquid separation step using a specific flasher, a separation and removal step of impurities using a scrubber, and a reusing step of ethylene, a continuous operation for a long term is possible in producing α-olefin, while reducing the clogging of pipe lines and the like in a recovery step of unreacted ethylene.

Comparative Example 1

The same method was performed as in Example 1 except for bypassing the scrubber 8 and the scrubber 9 in Example 1, thereby not performing the step 3 (separation and removal of catalyst).

After performing the above-described continuous operation for 30 days, inside the heat exchanger 6 and the heat exchanger 7 was clogged and pressure loss increased, and therefore the operation was stopped. Inside the heat exchanger 6 and the heat exchanger 7 was examined and deposits were seen.

Comparative Example 2

The same method is performed as in Example 1 except for setting the separation drop size $d_L$ of the flasher 3 in Example 1 to be more than $1.0\times10^{-4}$ m.

When the above-described continuous operation is performed, dirt and clogging in pipe lines from the flasher to the scrubber 8 or the scrubber 9 occur, and therefore the continuous operation becomes difficult.

REFERENCE SIGNS LIST

1: Reactor
2, 4, 12: Control valve
3, 5: Flasher
8, 9: Scrubber
6, 7: Heat exchanger
10, 11: Gas-liquid separation tank

The invention claimed is:

1. A method for producing an α-olefin, the method comprising:

(1) continuously introducing an ethylene and a catalyst into a reactor, followed by mixing and polymerizing to obtain a reaction mixture;

(2) continuously separating the reaction mixture into a gas A and a liquid B in a flasher having a separation drop size $d_L$ of formula (1) below of $1.0\times10^{-4}$ m or less:

$$d_L = \sqrt{\frac{18\mu v}{g(\rho_L - \rho_V)}}, \quad (1)$$

v being rising speed of a gas in the flasher in m/s, $\rho_V$ being density of the gas A in $kg/m^3$, $\rho_L$ being density of the liquid B in $kg/m^3$, g being gravitational acceleration in $m/s^2$, and μ being viscosity of the gas A in Pa·s;

(3) bringing the gas A into contact with a solvent in a scrubber to obtain a gas C comprising an unreacted ethylene and a liquid D comprising the solvent; and (4) reusing the gas C in a polymerization reaction.

2. The method of claim 1, wherein the scrubber is a plate type scrubber.

3. The method of claim 1, wherein the scrubber is a bubble tower type scrubber.

4. The method of claim 1, wherein, in the bringing (3), a temperature of a liquid in the scrubber is kept at 100° C. or more.

5. The method of claim 1, wherein the liquid D obtained in the the bringing (3) is fed to the flasher.

6. The method of claim 1, wherein the continuously separating (2) comprises continuously separating the reaction mixture into a gas A and a liquid B in a first flasher having a separation drop size $d_L$ of the formula (1) of $1.0\times10^{-4}$ m or less and then further continuously separating the liquid B into a gas E and a liquid F in a second flasher having a separation drop size $d_L$ of the formula (1) of $1.0\times10^{-4}$ m or less;

wherein the bringing (3) comprises (3-i) bringing the gas A into contact with a solvent in a first scrubber to obtain a gas C comprising an unreacted ethylene and a liquid D comprising the solvent and (3-ii) bringing the gas E into contact with a solvent in a second scrubber to obtain a gas G comprising an unreacted ethylene and a liquid H comprising the solvent; and wherein the reusing (4) comprises reusing the gas C and the gas G in a polymerization reaction.

7. The method of claim 6, wherein the liquid H obtained in the bringing (3) is fed to the second flasher.

* * * * *